United States Patent
Clark et al.

(10) Patent No.: US 6,336,750 B1
(45) Date of Patent: Jan. 8, 2002

(54) STRUCTURED ARC TECHNIQUE USING A FOCUSING SLEEVE

(75) Inventors: Brett G. Clark, Whites Creek; Scot K. Ware, Brentwood, both of TN (US)

(73) Assignee: Amherst Holding Co., Wilmington, DE (US)

( * ) Notice: Subject to any disclaimer, the term of this patent is extended or adjusted under 35 U.S.C. 154(b) by 0 days.

(21) Appl. No.: 09/549,173

(22) Filed: Apr. 13, 2000

(51) Int. Cl.$^7$ ............................................... G02B 6/255
(52) U.S. Cl. ............... 385/96; 219/121.13; 219/121.14; 219/122; 385/95; 385/97; 385/98
(58) Field of Search .................. 385/95–98; 219/121.13, 219/121.14, 383–384, 121.11, 122, 60 R, 69.1; 313/146; 204/280

(56) References Cited

U.S. PATENT DOCUMENTS

| | | | |
|---|---|---|---|
| 4,957,343 A | 9/1990 | Sato et al. | 350/96.21 |
| 5,534,747 A | 7/1996 | Carruthers | 313/456 |
| 5,869,923 A | 2/1999 | Strzelichowski et al. | 313/440 |
| 5,942,039 A | 8/1999 | Kholodenko et al. | 118/723 |

FOREIGN PATENT DOCUMENTS

| | | | | |
|---|---|---|---|---|
| JP | 2001-066456 | * | 3/2001 | G02B/6/255 |

OTHER PUBLICATIONS

Tosco, Federico, *Fiber Optic Communications Handbook*, Second Edition, 1990, pp. 723–726.#jf139##

Primary Examiner—John D. Lee
Assistant Examiner—Jerry T Rahll
(74) Attorney, Agent, or Firm—Banner & Witcoff, Ltd.

(57) ABSTRACT

The present invention introduces an arc shaping member to be used in fiber optic fusion splicers. The use of the an arc shaping member may minimize the undesirable effects of grunge and/or deposits than can buildup on arc electrodes. The buildup of grunge or other deposits can cause formation of an irregular electrical arc possibly resulting in an undesirable splice. The arc shaping member may be a passive or active. In a fiber optic splicer, the arc shaping member may be mounted in a plane parallel to the optical fiber(s) being spliced and in a plane perpendicular to the arc electrodes. The arc shaping member may be installed such that the member surrounds the electric arc created by the arc electrodes. The presence of the arc shaping member causes the electric arc to maintain the desired shape and/or intensity. An operator may control, independent of the arc voltage, the shape, size and heat intensity of the electrical arc. The shape of the electric arc may be controlled for increasing and/or decreasing the focus of heat intensity at a desired location.

30 Claims, 9 Drawing Sheets

STRUCTURED ARC TECHNIQUE USING A FOCUSING SLEEVE

FIELD OF INVENTION

The present invention relates to fusion splicing of optical fibers and more particularly, the present invention relates to a structured arc technique using a focusing sleeve for focusing the electric arc used to fuse optical fibers.

BACKGROUND OF INVENTION

A preferred technique for permanently joining two optical fibers utilizes a fusion splice. A fusion splice is created by localized heating of the ends of the two optical fibers to be joined. Since optical fibers are generally made from multi-component glass, quartz, synthetic resins and/or other material, the localized heating causes the two fiber ends to "fuse" together. This results in a continuous length of material with minimum discontinuities and/or reflections at the splice point. One of the most commonly known heating source utilized to fuse the fibers together is an electric arc. However, other techniques, for example, a micro-flame or a $CO_2$ lasers may also be used.

FIGS. 1–4 show a prior art technique related to fusion splicing of optical fibers. FIG. 1 shows a basic configuration that is used for fusion splicing two optical fibers using an electric arc. Individual fibers 101 and 102 are carefully prepared by removing, for example, outer cable jackets, buffer tubing, primary coating placed directly on the fibers and/or other protective material. Each fiber is carefully cleaned and perpendicularly cleaved to form a perpendicular edge. The fibers are placed and secured in a jig that is comprised of movable plates 103 and 104. The plates have a vee-grove 105 for retaining the optical fibers. A mechanical clasp or similar mechanical fastener may be used to prevent the fibers from becoming mis-aligned. The configuration further includes electrodes 106 and 107 for producing an electrical arc. As shown, electrode 107 is connected to the positive side of the high voltage arc supply 108 and electrode 106 is connected to the negative side of the high voltage arc supply 108.

FIGS. 2a–c show the operation of the basic configuration of FIG. 1. Initially the fibers 101 and 102 are separated by a short gap and are aligned so that their cores are matched together, as shown in FIG. 2a. As shown in FIG. 2b, a brief electric arc discharge may be applied at the splicing point at the so that surface defects, imperfect fiber end preparation such as burrs or lip, are eliminated. The fibers are subsequently butted together and a constant electrical arc 110 is applied via the electrodes 107 and 106, as shown in FIG. 2c. The electric arc 110 is formed by a large flow of electrons from the positive electrode 107 to the negative electrode 106. The high voltage required to create the electric arc 110 is supplied by the high voltage arc supply 108. The intense heat generated by the high voltage electric arc 110 at the splice point causes the fibers to fuse together and generally the fiber cores are matched as closely as possible. If the preparation, alignment and arc 110 discharge occur properly, the result may be a continuous fiber strand with minimum losses at the splice points.

Problems associated with using a high voltage electric arc 110 for the heat source are shown in FIGS. 3 and 4. After use, grunge and/or carbon deposits 301 can build up on the tips of the electrodes 106 and 107. The grunge and/or carbon deposit buildup 301 and 302 can cause the position and/or the intensity of the electric arc 110 to vary. As shown in FIG. 3, if the grunge buildup 301 is heavier on one side of the electrodes, this may result in the initial formation of an uneven electric arc 110 which may prevent the proper heating required to form a desirable splice. For example, the fiber cores may not fuse together properly resulting in an undesirable splice with increased losses at the splice points.

As shown in FIG. 4, if the grunge buildup 301 is on both sides, then initially the electric arc may not be of the desired intensity required for a proper fusion splice. In addition, as the grunge is burned off, then the intensity of the arc may increase as the voltage across the electrode remains constant since the grunge is more transmissive than air. Thus, again resulting in the possibility of an undesirable splice.

Due to carbon/grunge deposits, an operator may spend increased time in constantly cleaning the electrode tips. In addition, there is a possibility that the electrode tips may be damaged due to the deposit buildup or during cleaning of the electrodes. Although the intensity of electrical arc 110 may be controlled by varying the voltage on the high voltage arc supply 108, controlling the shape or focusing the intensity of the electrical arc 110 may not be possible using conventional techniques. For example, it may desirable to narrow the electrical arc 110 for focused heating at a splice point. In the alternative, it may be desirable to increase the width to reduce the heat generated at the splice point.

This problem can be magnified when the fusion-splicing device is used for simultaneously fusing a plurality of optical fibers. Such a device is commonly called a mass fusion splicer. In a mass fusion splicer, an imperfect arc caused by grunge or buildup 301 can cause some of the fibers not to fuse properly. In addition, it may further be desirable to control the electrical arc for focused heating, for example, while performing the mass splice.

However, no conventional techniques are known to exist that permit the electric arc in a fusion splicer to be controlled such that the effects of deposit buildup may be eliminated.

What is needed is an apparatus and method for fusion splicing optical fibers that prevents the formation of an uneven electrical arc at a splice point so that a proper fiber optic splice may be formed. What is also needed is a method and apparatus for fusion splicing optical fibers that minimizes the effect of grunge and/or deposits on electrode tips such that cleaning of the electrode tips may be reduced or even eliminated. What is further needed is a way of controlling the shape of the electric arc for increasing and/or decreasing the focus of heat intensity at a particular location.

SUMMARY OF THE INVENTION

The present invention introduces an arc shaping member to be used in fiber optic fusion splicers. The use of the arc shaping member, referred to herein as a focusing sleeve, may minimize the undesirable effects of grunge and/or deposits than can buildup on arc electrodes. The buildup of grunge or other deposits can cause formation of an irregular electrical arc possibly resulting in an undesirable splice. In a fiber optic splicer, a focusing sleeve may be mounted in a plane parallel to the optical fibers being spliced and in a plane perpendicular to the arc electrodes. The focusing sleeve may be installed such that the sleeve surrounds the electric arc created by the arc electrodes. The presence of the focusing sleeve causes the electric arc to maintain the desired shape and/or intensity. The present invention may reduce the effect of grunge and/or carbon or other such deposits on the electrode tips such that cleaning of the electrode tips may be reduced or even become unnecessary. Embodiments of present invention may further permit an operator to control, independent of the arc voltage, the shape, size and heat intensity of the electrical arc. The shape of the electric arc may be controlled for increasing and/or decreasing the focus of heat intensity at a desired location.

In embodiments of the present invention, the focusing sleeve may be mounted on one or both sides of the optical fibers. The focusing sleeve may be made out of a plurality of differing materials, for example, gold, platinum, tungsten, rhodium and/or other suitable material. The focusing sleeve (s) may be removably attached to a holder for holding the sleeve(s) in the desirable position. In embodiments of the present invention, the holder may be slidably coupled to a rail such that the position of the holder and/or focusing sleeves may be variable. In embodiments of the present invention, the size, shape and location of the focusing sleeve(s) may be variable so that the shape of the electric arc may be controlled, independent of the arc current or voltage. In an alternative embodiment, the arc shaping member can be in the form of a substantially completed ring having first and second ends. The ends may be connected to a voltage supply to control the focus of the electric arc.

Although the invention has been defined using the appended claims, these claims are exemplary and limiting to the extent that the invention is meant to include one or more elements from the apparatus and methods described herein. Accordingly, there are any number of alternative combinations for defining the invention, which incorporate one or more elements from the specification (including the drawings, and claims) in any combinations or subcombinations.

BRIEF DESCRIPTION OF THE DRAWINGS

For a better understanding of the present invention, reference is made to the following description of exemplary embodiments thereof, considered in conjunction with the accompanying drawings in which.

DETAILED DESCRIPTION OF THE INVENTION

Illustrative systems and methods for splicing optical fibers under embodiments of the present invention will be described according to the present invention. Embodiments of the present invention as described herein shows an arc shaping member for use in fiber optic fusion splicers. As described herein the arc shaping member is referred to as a focusing sleeve. It is recognized that any arch shaping member(s) may be used for focusing or shaping the electric arc. Utilizing embodiments of the focusing sleeve in fiber optic fusion splicers may improve the quality of the optical splices as well reduce and/or eliminate the time and labor expended in cleaning electrodes. Moreover, embodiments of the present invention may permit an operator to control or focus the intensity and/or shape of the electrical arc on a desired location on the optical fibers.

Figure 1:
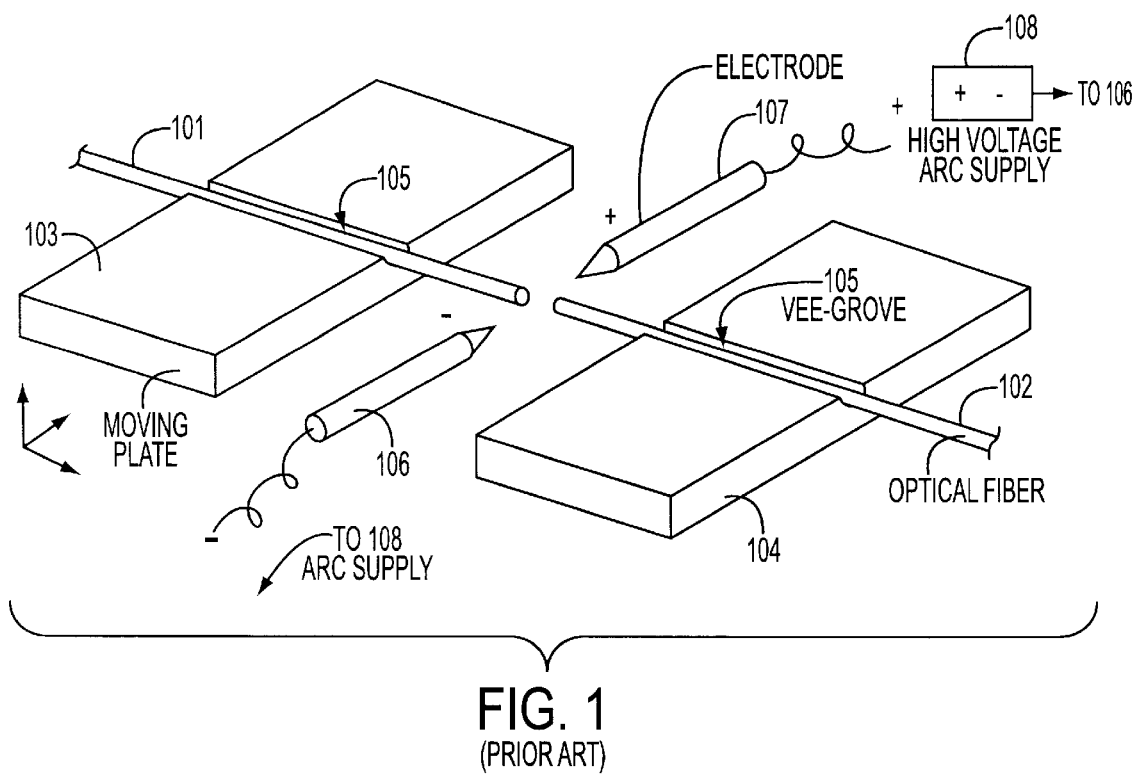
FIGS. 1, 2a–2c, 3 and 4 shows a prior art method for fusing optical fibers using an electric arc.
Figure 2A:
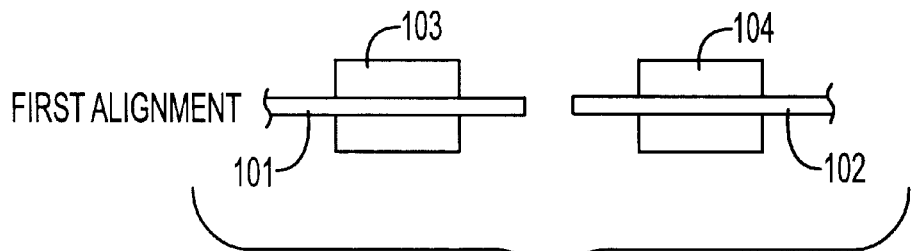
Figure 2B:
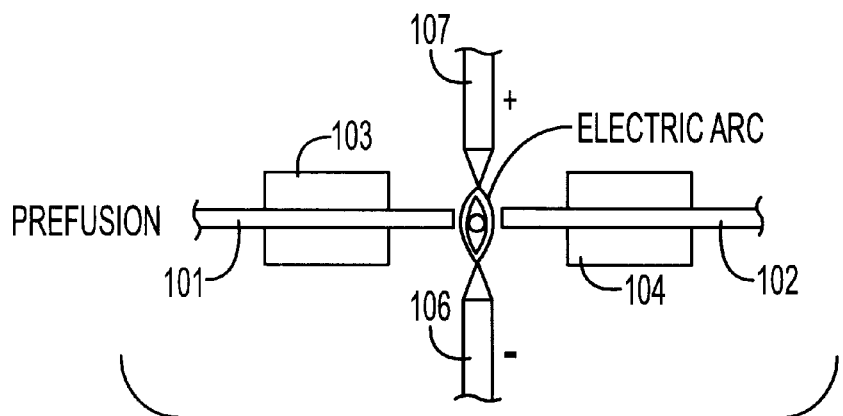
Figure 2C:
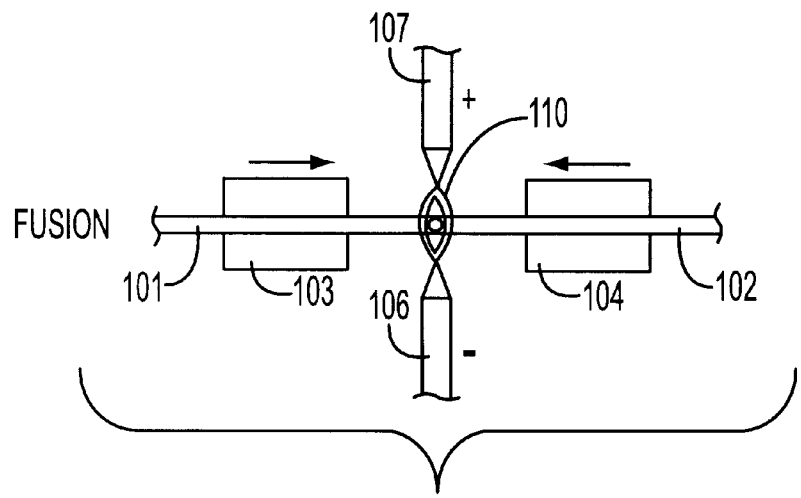
Figure 3:
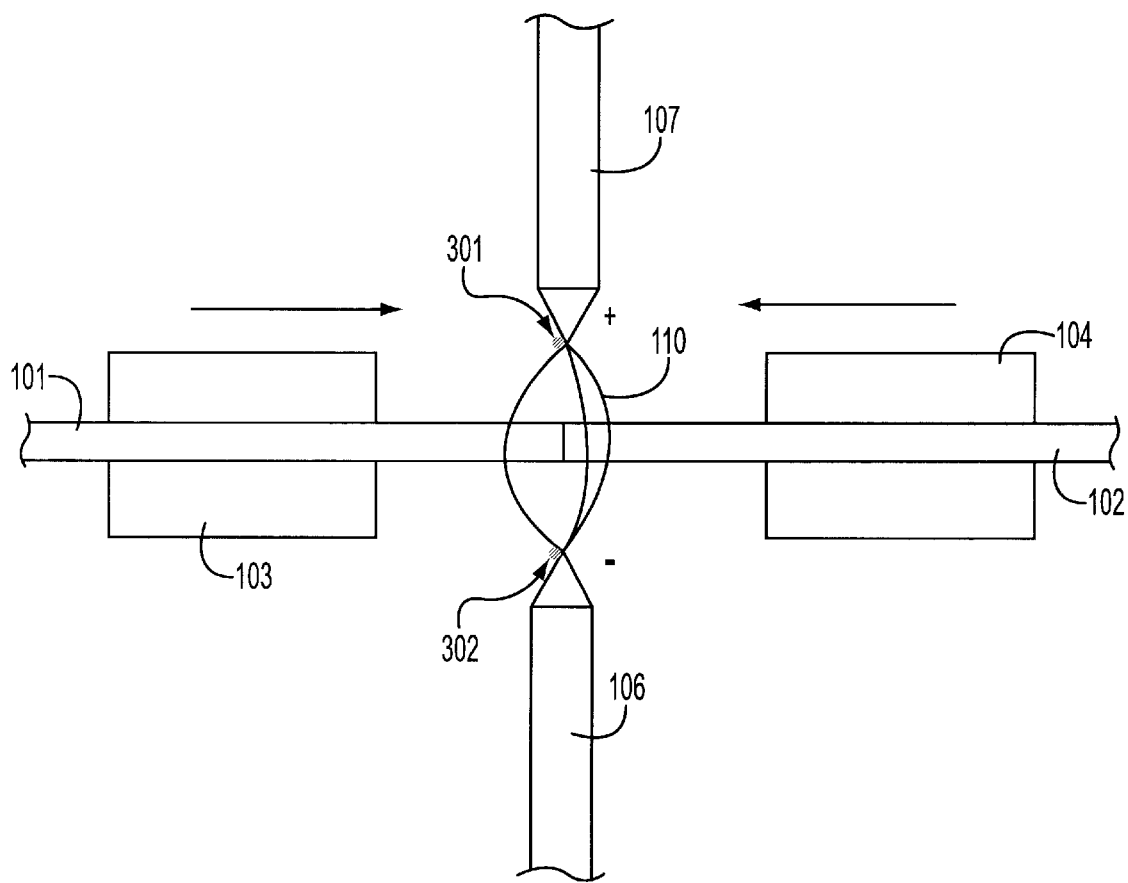
Figure 4:
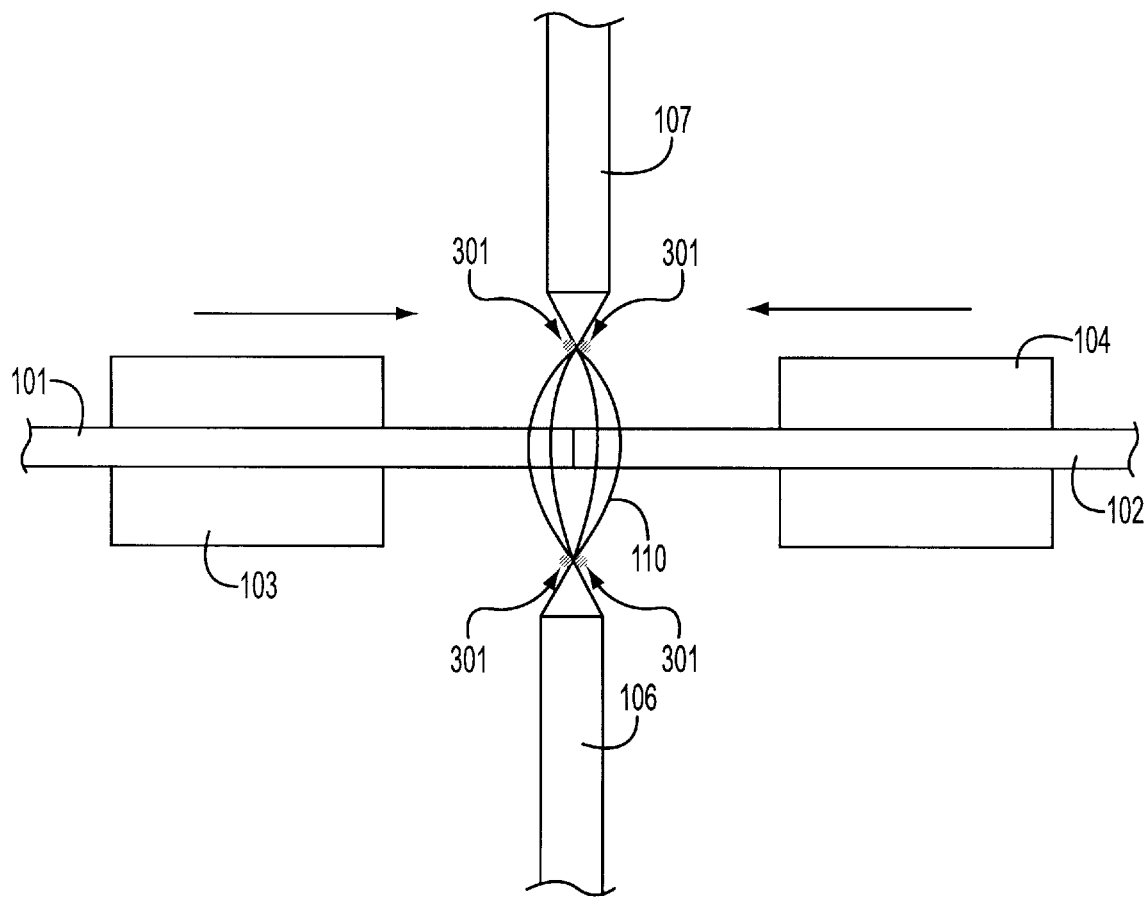
Figure 5:
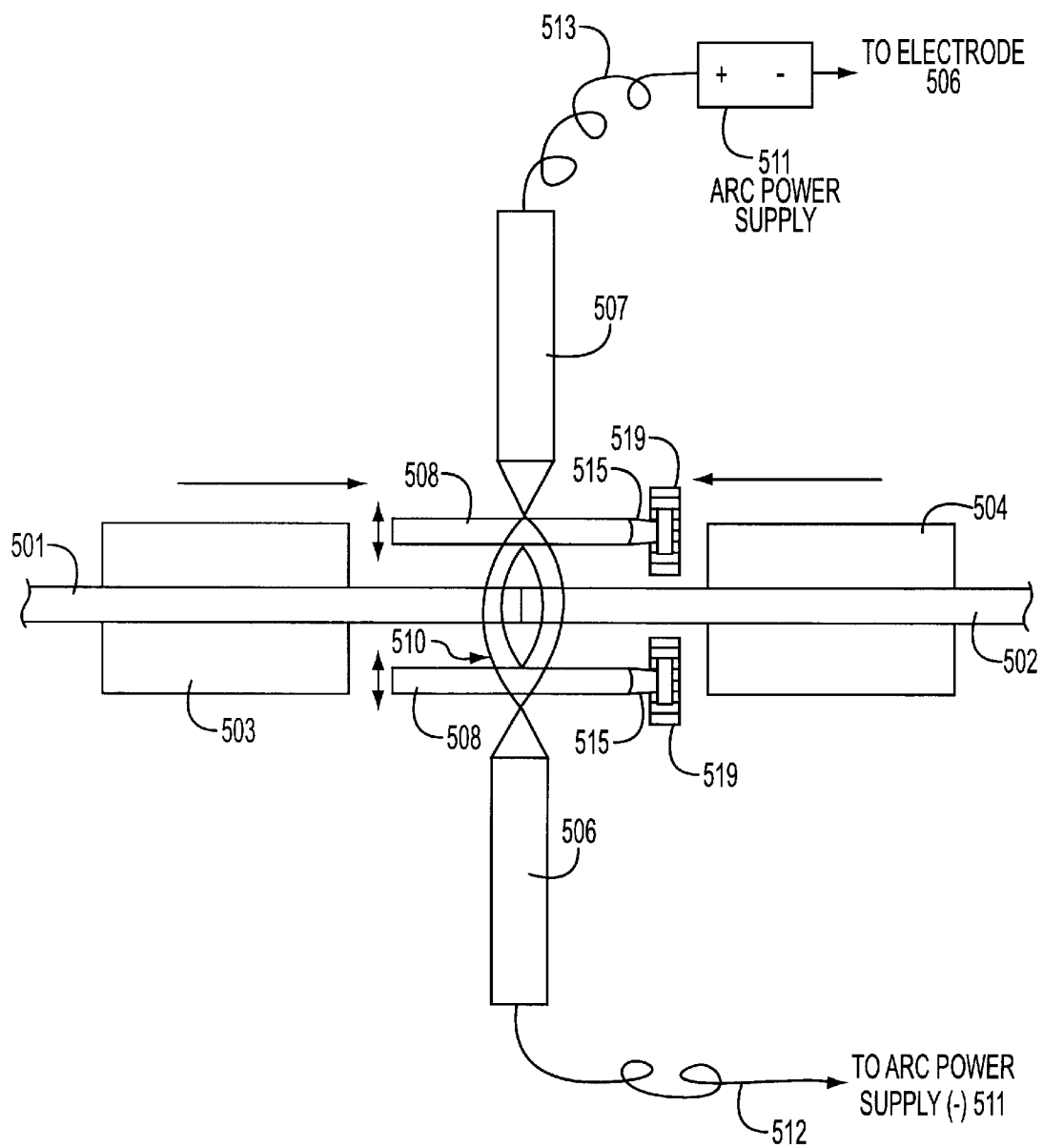
FIG. 5 show an exemplary embodiment of the present invention showing a focusing sleeve as utilized in splicing optical fibers.

FIG. 5 shows one exemplary embodiment of the present invention. As shown in FIG. 5, optical fibers 501 and 502, to be spliced together, are placed in a jig comprising of movable plates 503 and 504, respectively. The technique shown for splicing the optical fibers 501 and 502 utilizes an electric arc 510 that is generated by the electrodes 506 and 507. The electrodes 506 and 507 are connected to an arc power supply 511 via wires or leads 512 and 513 respectively. As shown, electrode 506 may be connected to the negative (−) terminal of the arc power supply 511 via lead 512 and electrode 507 may be connected to the positive (+) terminal of the arc power supply 511 via lead 513. Typically the arc power supply 511 is an alternating current (AC) high voltage supply that generates a high amperage current across the electrodes 507 and 508. The power supply 511 may be able to supply fixed and/or variable voltage levels. The power supply 511 may be an AC power supply as described above, or in the alternative, may be any other suitable power supply. In embodiments of the present invention, focusing sleeves 508 may be installed in a plane parallel to the optical fibers 501 and 502 and in a plane perpendicular to the electrodes 506 and 507, as shown in FIG. 5. In alternative embodiments of the present invention, the focusing sleeve 508 may be installed on one or both sides of the optical fibers 501 and 502. The focusing sleeve may be made out of a plurality of differing materials, for example, tungsten, gold, platinum, rhodium, and/or other suitable material and/or any combination thereof. It is recognized that any suitable metal or combinations of differing metals and/or combinations of other material may be used in embodiments of the present invention.

The focusing sleeve(s) 508 may be mounted using any suitable fastener or holder 515. In a preferred embodiment, the focusing sleeve 508 may be removably attached to holder 515 by any suitable mechanism. The holders 515 may be mounted on, for example, rails 519 such that by either manual or automatic adjustments, the holders 515 may slide on rails 519 to vary the distance between the focusing sleeve(s) 508 and the optical fibers 501 and 502 (as shown by the double arrows). Accordingly, the shape of the electric arc 510 may be varied as the distance between the focusing sleeve(s) 508 and optical fibers 501 and 502 varies. For example, if it is desirable that the electric arc 510 be narrower at the splice point 520, then the holder(s) 515 may be adjusted so that the focusing sleeve(s) 508 are moved closer to optical fibers 501 and 502. If, on the other hand, it is desirable that the electric arc 510 be wider at the splice point 520, then the holder(s) 515 may be adjusted so that the focusing sleeve(s) 508 are moved away from optical fibers 501 and 502 and closer to electrodes 506 and 507, respectively. It is to be understood that the holders 515 and rails 519 are given by example only, and that any suitable holder or adjustment mechanism may be used to hold and/or mount focusing sleeves 508. Preferably the holders 515 and/or rails 519 are be made of an insulating ceramic. Alternatively, the holders may be mad of a high melt plastic, metal and/or any other suitable material. It is recognized that if the holder 515 is made of a metal, then an insulating layer will be required between the holder 515 and the rail 519, or alternatively between the rail 519 and the splicer itself. In addition, any suitable device or technique may be used to permit the holder 515 and/or focusing sleeve(s) 508 to be moved in order to vary the electric arc 510, as described above.

Referring again to FIG. 5, optical fibers 501, 502 may be cleaned, cleaved and subsequently placed on movable plates 503 and 504 respectively. The optical fibers 501, 502 may be secured to respective movable plates 503, 504 using a mechanical clasp or similar mechanical fastener (not shown). The optical fibers 501 and 502 are subsequently butted together with accurate alignment and suitable pressure and a constant electrical arc 510 is applied via the electrodes 507 and 506. As is known, during initiation of the electric arc, grunge build up may cause the electric arc 510 to vary in shape and/or intensity. Under embodiments of the present invention, utilizing the focusing sleeve(s) 508 may reduce and/or eliminate the effect of any grunge and/or carbon deposit buildup on electrodes 506 and 507. Since the effect of the grunge or buildup is reduced or eliminated, the need to constantly clean the electrodes 506 and 507 may be reduced.

Figure 6:
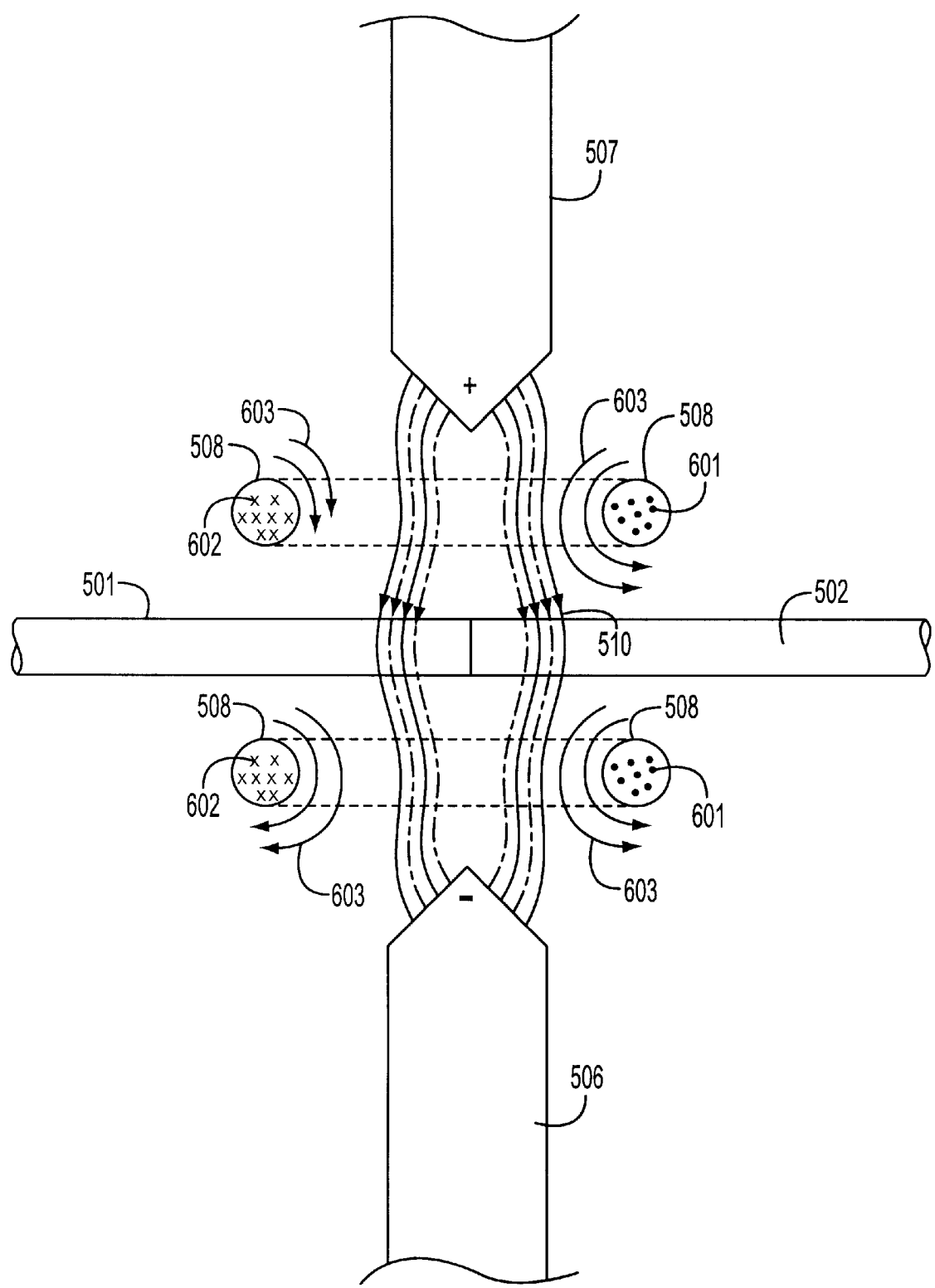
FIG. 6 shows the operation of an exemplary embodiment of the present invention.

The operation of the present invention is now described in detail in reference to FIG. 6. In embodiments of the present invention, the focus, size and/or intensity of the electrical arc 510 may be controlled as desirable. As shown, an electric arc 510 is generated between positive electrode 507 to negative electrode 506. Electrical arc 510 is created by a flow of electrons from the negative electrode 506 to positive electrode 507. The magnetic field (not shown) created by electric arc 510 induces a current flow in each focusing sleeve 508, which are mounted in a plane that is parallel to optical fibers 501 and 502 and around the electrical arc 510. The flow of electrons or current creates a magnetic field 603 around electrical arc 510. The current induced within each focusing sleeve 508 on the right side of electrodes 507 and 506 is represented by dots 601, which indicate that the induced current is flowing out of FIG. 6. The current induced within each focusing sleeve 508 on the left side of the electrodes 507 and 508 is represented by Xs 602, indicating that the induced current is flowing into FIG. 6. The current flow represented by dots 601 and Xs 602 induced within each focusing sleeve 508 causes a magnetic field around the focusing sleeve 508, represented by flux lines 603 in the direction indicated by the arrows. Fields 603 repels electric arc 510 created between electrodes 506 and 507, and causes electric arc 510 to become narrower and/or maintain its shape. Accordingly, a narrower arc 510 maintains a desirable arc intensity and/or arc shape from the instant the electric arc 510 is first created until the splice is completed and the arc is terminated. Consequently, a more uniform and desirable optical splice is produced. Thus, optical fibers 501 and 502 are optically spliced without distortions that are normally caused by an electric arc having a varying size and/or intensity. Additionally, introduction of focusing sleeve 508 reduces the need for cleaning the electrode tips, thus reducing the amount of time an operator spends in cleaning the electrodes and reducing the possibility of electrode tip damage. The distance of the focusing sleeves 508 from the optical fibers 501 and 502 can be varied either manually or automatically by any method or technique and/or by changing the shape of focusing sleeves 508. Additionally, the fields and the resulting focus of electric arc 510 may be further controlled by varying the voltage supplied to electrodes 507 and 508.

Figure 7:
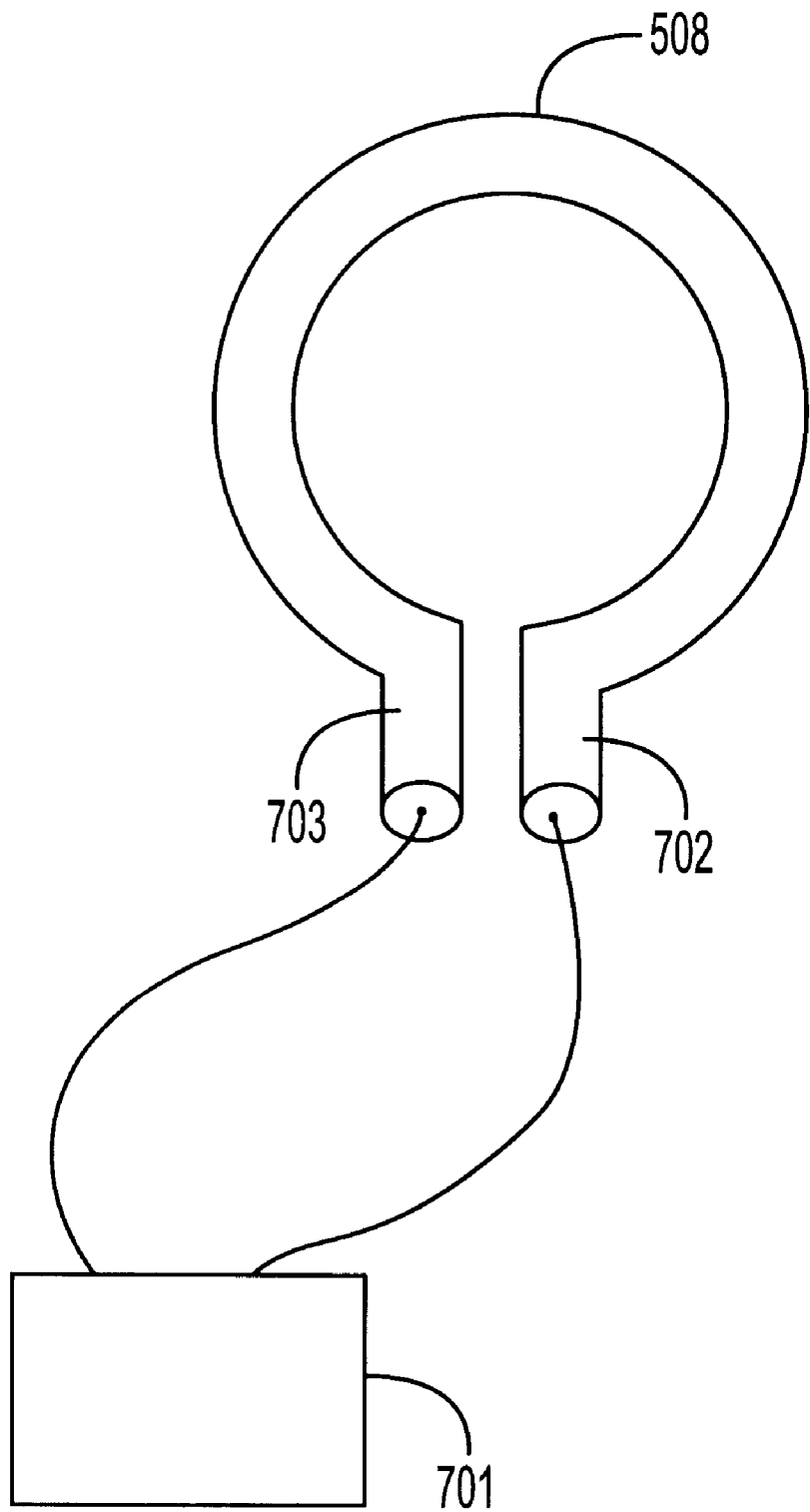
FIG. 7 shows a focusing sleeve coupled to a voltage supply.

FIG. 7 is an alternative preferred embodiment of focusing sleeve 508. As shown, focusing sleeve 508 is a substantially complete ring having ends 702 and 703. Ends 702 and 703 may be connected to an AC voltage supply 701 for applying a potential to the focusing sleeve 508. The AC potential preferably has a frequency between 30 kHz and 100 kHz. In operation, the high frequency generated by the power supply 701 in focusing ring 508 causes a change in the magnetic field 603. The changing field causes repels the electric arc 510 created between electrodes 506 and 507, and causes electric arc 510 to become narrower and/or maintain its shape. By varying the potential and /or frequency applied to the focusing sleeve, the focus and/or intensity of the electric arc 510 can be controlled or regulated. Thus an active focusing sleeve 508 as shown in FIG. 7 can add additional flexibility in controlling the electric arc.

Figure 8:
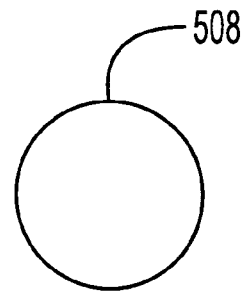
FIG. 8 and 9 show exemplary embodiments of the focusing sleeve.
Figure 9:
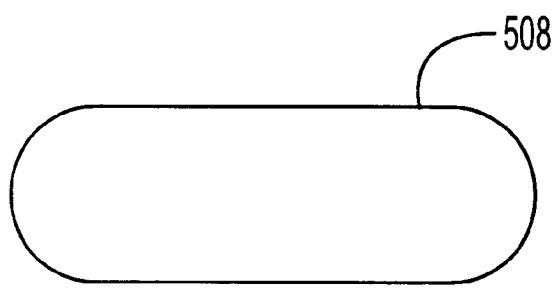
Figure 10:
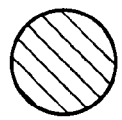
FIGS. 10 and 11 show cross sectional views of exemplary embodiments of focusing sleeve.
Figure 11:
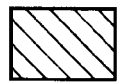

In embodiments of the present invention, the shape and/or size of the focusing sleeve used may vary as desired so that the shape of the electric arc may be controlled for particular user parameters. FIGS. 8 and 9 show two exemplary embodiments of focusing sleeves. As shown in FIG. 8, the focusing sleeve 508 is in the shape of a circle or ring. As shown in FIG. 9, the focusing sleeve is in the shape of an ellipse. Although complete rings are shown in FIGS. 8 and 9, it is recognized that the focusing sleeve 508 can have ends 702 and 703 for connecting with a voltage supply. The focusing sleeves 508 may have a circular cross section, as shown in FIG. 10, or may have a rectangular cross section, as shown in FIG. 11. It is recognized that focusing sleeves of differing shapes will produce different effects on the shape of the electric arc 510, and use of certain shaped sleeves will depend on the particular intended use.

Figure 12:
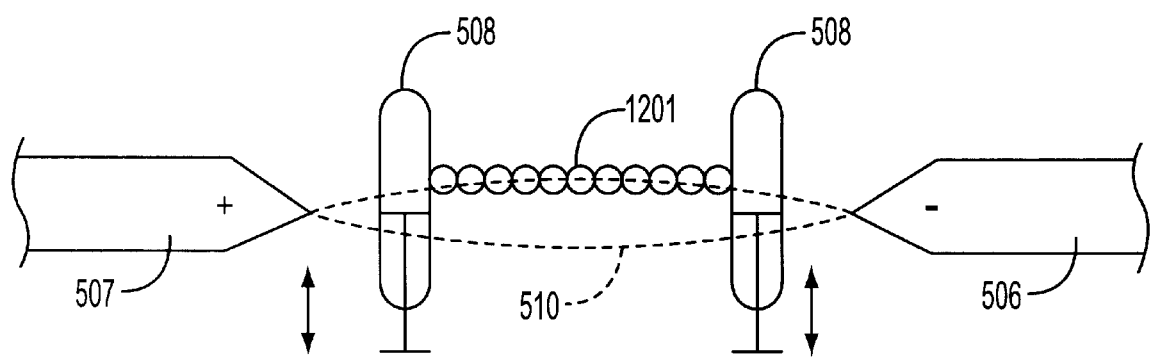
FIG. 12 is an exemplary embodiment showing a focusing ring as used in a mass fiber optic splicer.

FIG. 12 shows the embodiment of FIG. 6 being used with a mass fiber fusion splicer. FIG. 12 is a side view showing the splicing of a multi-fiber ribbon cable 1201 using focusing sleeve(s) 508. Although fusion splicing of a mass fiber optical cable is known, prior art methods may magnify the same drawbacks as encountered in splicing single fibers. Prior art techniques may suffer from additional problems such as lack of proper alignment of the multi-fiber cable with respect to the intensity and/or focus of electric arc 510. Under embodiments of the present invention, focusing sleeves 508 may minimize such problems since the electric arc 510 can be better focused and/or aligned with respect to the multi-fiber cable 1201. As is illustrated in FIG. 12, the focusing sleeve(s) can be adjusted up or down in the direction of the double arrows, such that the focus and/or intensity of the electrical arc 5 10 can be controlled.

Under embodiments of the present invention, the use of the focusing sleeve(s) 508 may minimize the undesirable effects of grunge and/or deposits than can buildup on arc electrodes 506 and 507. As described, passive or active focusing sleeves 508 can be used. The buildup of grunge or other deposits can cause formation of an irregular electrical arc possibly resulting in an undesirable splice. In a fiber optic splicer, a focusing sleeve 508 may be mounted parallel to the optical fiber(s) 501 and 502 being spliced and perpendicular to the arc electrodes 506 and 507. The focusing sleeve(s) 508 may be installed such that the sleeve surrounds the electric arc 510 created by the arc electrodes 506 and 507. The presence of the focusing sleeve 508 causes the electric arc 510 to maintain the desired shape and/or intensity. Additional, focus and control of arc 510 can be provided by connecting a voltage supply 701 to the focusing sleeve 508. The present invention may reduce the effect of grunge and/or carbon or other such deposits on the electrode tips such that cleaning of the electrode tips may be reduced or even become unnecessary. Embodiments of present invention may further permit an operator to better control, independent of the arc voltage, the shape, size and heat intensity of the electrical arc. The shape of the electric arc may be controlled for increasing and/or decreasing the focus of heat intensity at a desired location.

While particular embodiments of the present invention have been described and shown, it should be understood that the invention is not limited thereto since modifications may be made by persons skilled in the art. Although a focusing sleeve is shown in the figures and described herein, it is recognized that any arc shaping member(s) or element(s) may be utilized and appropriately positioned to control the shape of the electric arc in a fusion splicer. The present application contemplates any and all modifications that fall within the spirit and scope of the underlying invention disclosed and claimed herein.

I claim:

1. A splicer for fusing optical fibers comprising:

first and second electrodes, said electrodes capable of creating an electric arc there between for fusing the fibers; and a arc shaping member disposed between the electrodes.

2. The splicer of claim 1, wherein the arc shaping member is mounted in a plane perpendicular the electrodes.

3. The splicer of claim 2, the arc shaping member being positioned such that the arc shaping member surrounds the electric arc.

4. The splicer of claim 3, wherein the arc shaping member is mounted in a plane that is parallel to optical fibers.

5. The splicer of claim 4, further comprising:

a holder for mounting the arc shaping member.

6. The splicer of claim 5, further comprising:

a rail for slidably coupling the holder such that the distance between the arc shaping member and the optical fibers may vary.

7. The splicer of claim 1, wherein the arc shaping member is substantially circular in shape.

8. The splicer of claim 7, the arc shaping member having a hollow center wherein the arc extends through the hollow center.

9. The splicer of claim 8, wherein the arc shaping member has a substantially circular cross section.

10. The splicer of claim 8, wherein the arc shaping member has a substantially rectangular cross section.

11. The splicer of claim 7, the arc shaping member being a complete ring.

12. The splicer of claim 7, the arc shaping member being a substantially complete ring.

13. The splicer of claim 12, wherein the substantially complete ring has first and second ends, the first and second ends being connected to a voltage supply.

14. The splicer of claim 1, wherein the arc shaping member is substantially elliptical in shape.

15. The splicer of claim 14, the arc shaping member having a hollow center wherein the arc extends through the hollow center.

16. The splicer of claim 15, wherein the arc shaping member has a substantially circular cross section.

17. The splicer of claim 16, wherein the arc shaping member has a substantially rectangular cross section.

18. The splicer of claim 1, wherein the arc shaping member is metallic.

19. The splicer of claim 1, wherein the arc shaping member includes gold.

20. The splicer of claim 1, wherein the arc shaping member includes rhodium.

21. The splicer of claim 1, wherein the arc shaping member includes tungsten.

22. The splicer of claim 1, wherein the arc shaping member includes platinum.

23. A method for fusing optical fibers by controlling the focus of an electric arc generated across first and second electrodes in a fiber optic splicer, the method comprising the steps of:

providing the first and second electrodes on opposing sides of a fiber to be fused;

positioning a first arc shaping member between the electrodes; and generating a flow of electrons from the first to the second electrode.

24. The method as recited in claim 23, further comprising the step of:

adjusting the position of the first arc shaping member.

25. The method as recited in claim 24, wherein the adjusting and generating steps are performed simultaneously.

26. The method as recited in claim 25, further comprising the step of:

positioning a second arc shaping member between the electrodes.

27. The method as recited in claim 26, further comprising the step of:

adjusting the position of the second arc shaping member.

28. The method as recited in claim 27, further comprising the step of:

applying a voltage to the first arc shaping member.

29. The method as recited in claim 28, further comprising the step of:

applying the voltage to the second arc shaping member.

30. The method as recited in claim 29, further comprising the step of:

applying the voltage to the first and second arc shaping members simultaneously.

* * * * *